(12) United States Patent (10) Patent No.: US 12,579,189 B2
Lin (45) Date of Patent: Mar. 17, 2026

(54) METHOD, DEVICE, AND COMPUTER PROGRAM PRODUCT FOR GENERATING OBJECT IDENTIFIER

(71) Applicant: Dell Products L.P., Round Rock, TX (US)

(72) Inventor: Zhi Yuan Lin, Xiamen (CN)

(73) Assignee: Dell Products L.P., Round Rock, TX (US)

(*) Notice: Subject to any disclaimer, the term of this patent is extended or adjusted under 35 U.S.C. 154(b) by 14 days.

(21) Appl. No.: 18/658,616

(22) Filed: May 8, 2024

(65) Prior Publication Data

US 2025/0322015 A1 Oct. 16, 2025

(30) Foreign Application Priority Data

Apr. 12, 2024 (CN) .......................... 202410444362.3

(51) Int. Cl.
*G06F 16/901* (2019.01)
*G06F 16/906* (2019.01)
(52) U.S. Cl.
CPC ........ *G06F 16/9017* (2019.01); *G06F 16/906* (2019.01)
(58) Field of Classification Search
None
See application file for complete search history.

(56) References Cited

U.S. PATENT DOCUMENTS 8,332,508 B1 * 12/2012 Burrell ................ H04L 12/4625
709/224
9,037,912 B1 * 5/2015 Klein .................... G06F 11/263
714/36
10,797,987 B1 * 10/2020 Beacham ................ H04L 49/25
2005/0021847 A1 * 1/2005 Rothman .............. G06F 9/5011
709/225

(Continued)

OTHER PUBLICATIONS

Wikipedia, "Electronic Data Interchange," https://en.wikipedia.org/wiki/Electronic_data_interchange, Apr. 13, 2024, 10 pages.

(Continued)

*Primary Examiner* — Uyen T Le
(74) *Attorney, Agent, or Firm* — Ryan, Mason & Lewis, LLP

(57) ABSTRACT

A method in an illustrative embodiment includes obtaining a type of a target object from an object list. The method further includes classifying the target object into a corresponding registration category based on the type of the target object. The method further includes determining registration information for registering the target object in a remote system based on the corresponding registration category. In addition, the method further includes generating an object identifier for registering the target object in the remote system based on the type of the target object, the object list, and the registration information. In this way, the efficiency of generating object identifiers and the speed of performing the workflow are improved, while the time spent on registering objects in a remote system is reduced. Also, the accuracy of the generated object identifiers and the stability of the workflow are improved, while anomalies in the workflow are reduced.

20 Claims, 10 Drawing Sheets

(56)           References Cited

U.S. PATENT DOCUMENTS

| | | | | | |
|---|---|---|---|---|---|
| 2015/0229529 | A1* | 8/2015 | Engebretsen | ........... | H04L 67/10 |
| | | | | | 709/223 |
| 2020/0366752 | A1* | 11/2020 | White | ................. | G06F 11/3409 |
| 2021/0071896 | A1* | 3/2021 | Steiner | ..................... | F24F 11/52 |
| 2021/0232331 | A1* | 7/2021 | Kannan | ................... | G06N 20/00 |
| 2025/0180721 | A1* | 6/2025 | Hirzallah | ................ | H04W 4/02 |

OTHER PUBLICATIONS

Amazon Web Services, "What is Electronic Data Interchange?" https://aws.amazon.com/what-is/electronic-data-interchange/, Accessed May 2, 2024, 8 pages.
U.S. Customs and Border Protection, "Transmitting Data to CBP via Electronic Data Interchange (EDI)," https://www.cbp.gov/trade/automated/getting-started/transmitting-data-cbp-electronic-data-interchange-edi, Accessed May 2, 2024, 5 pages.

* cited by examiner

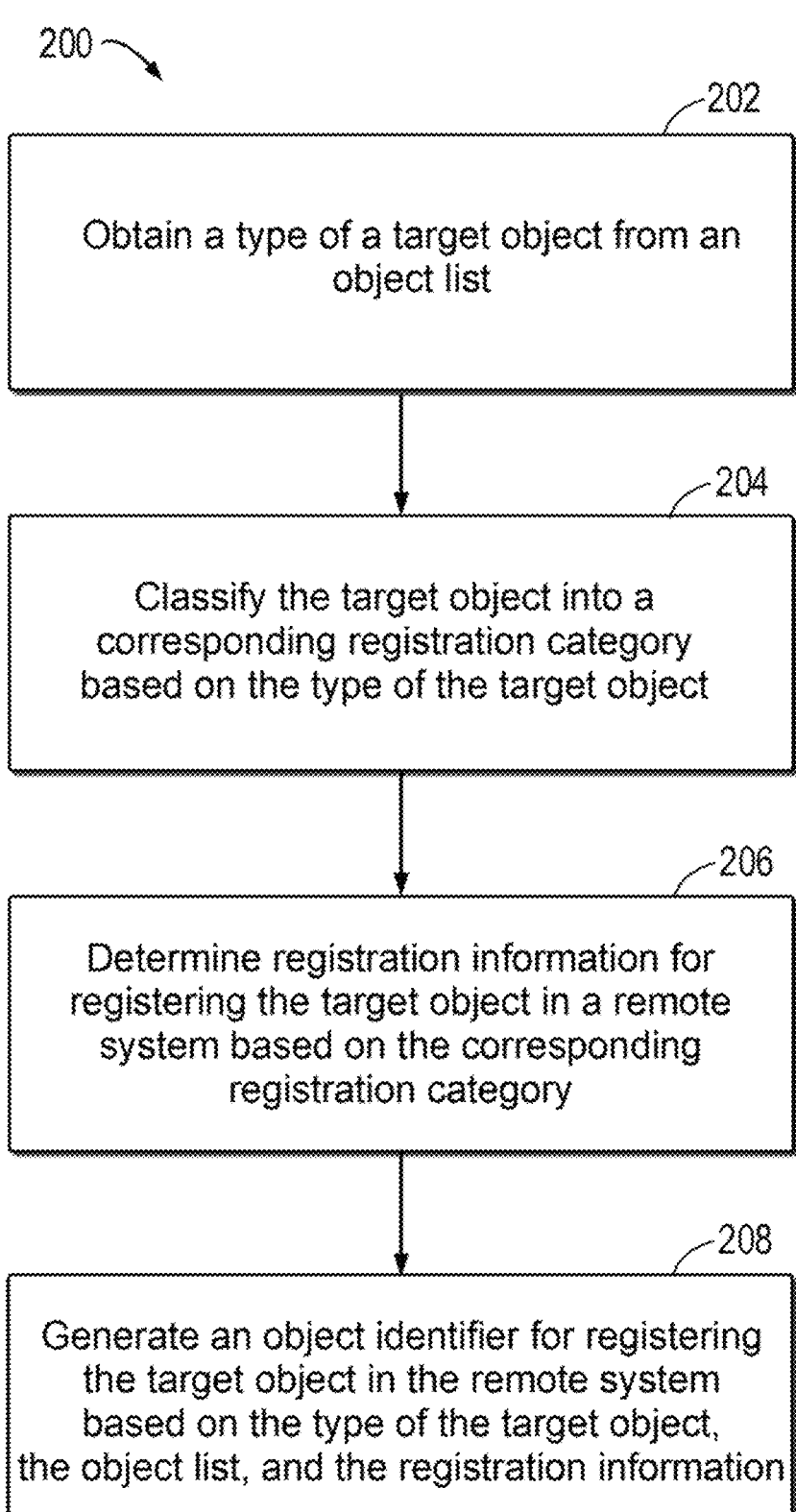

200

202

Obtain a type of a target object from an object list

204

Classify the target object into a corresponding registration category based on the type of the target object

206

Determine registration information for registering the target object in a remote system based on the corresponding registration category

208

Generate an object identifier for registering the target object in the remote system based on the type of the target object, the object list, and the registration information

FIG. 2

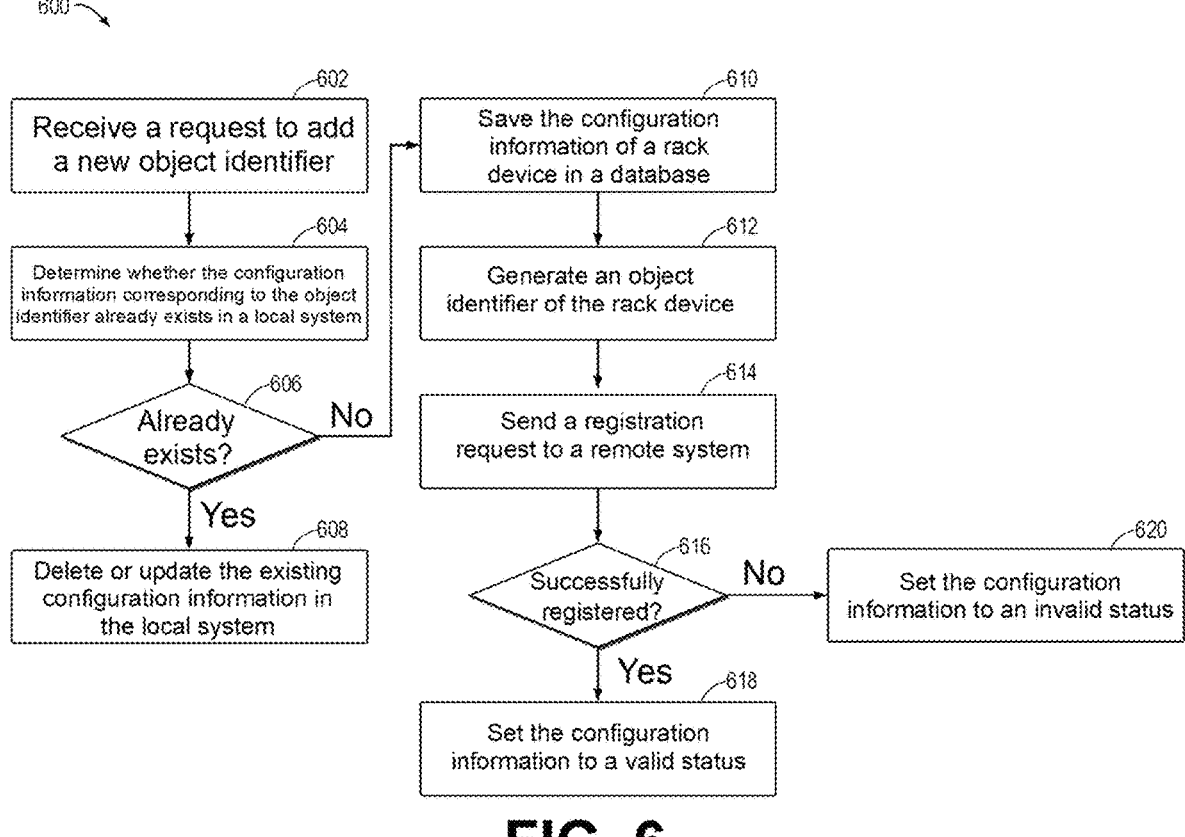

600

602
Receive a request to add a new object identifier

604
Determine whether the configuration information corresponding to the object identifier already exists in a local system 606
Already exists?

No

Yes

608
Delete or update the existing configuration information in the local system

610
Save the configuration information of a rack device in a database

612
Generate an object identifier of the rack device

614
Send a registration request to a remote system

616
Successfully registered?

No

620
Set the configuration information to an invalid status

Yes

618
Set the configuration information to a valid status

FIG. 6

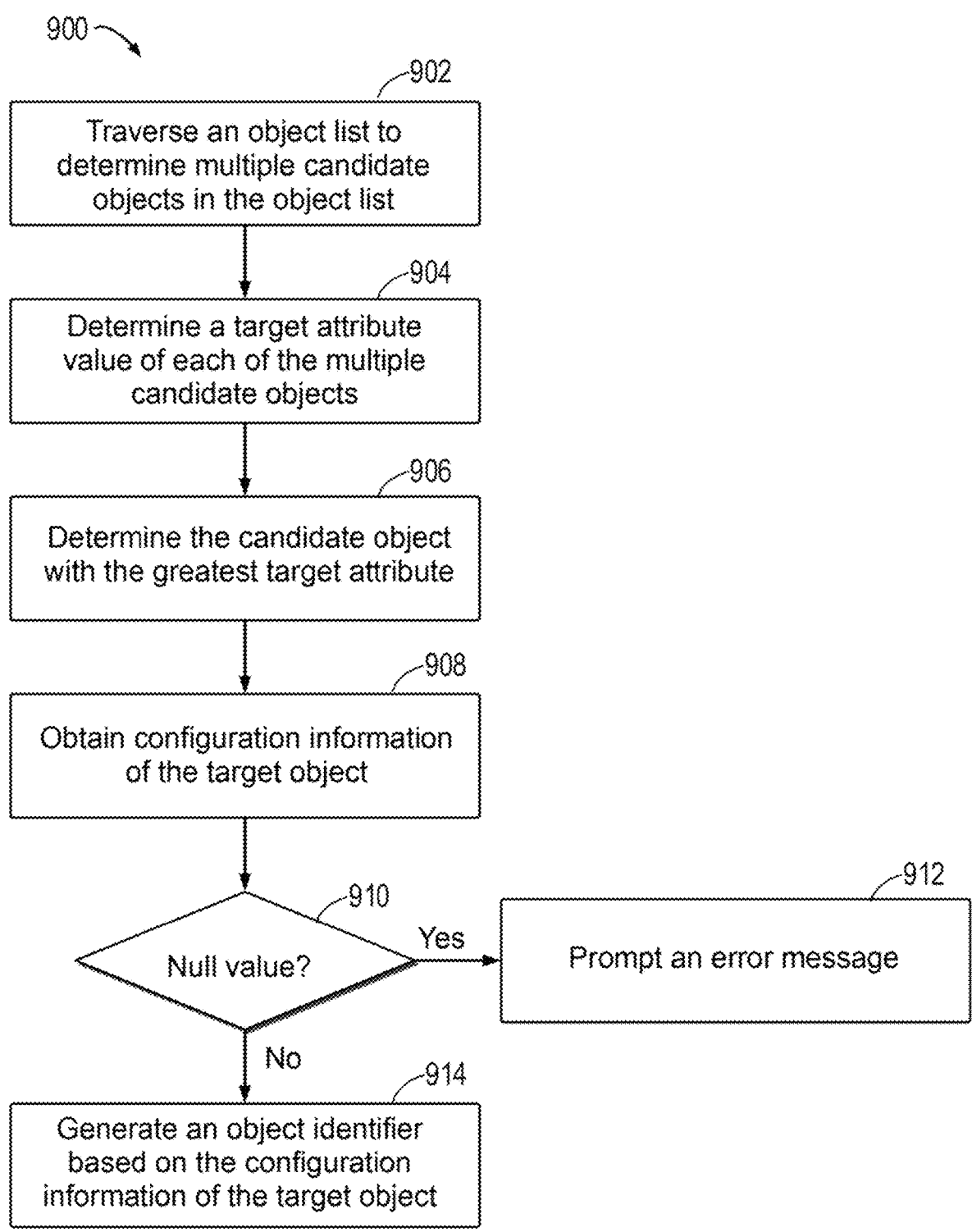

900

902
Traverse an object list to determine multiple candidate objects in the object list 904
Determine a target attribute value of each of the multiple candidate objects 906
Determine the candidate object with the greatest target attribute 908
Obtain configuration information of the target object 910
Null value?

Yes → 912
Prompt an error message

No
914
Generate an object identifier based on the configuration information of the target object

FIG. 9

METHOD, DEVICE, AND COMPUTER PROGRAM PRODUCT FOR GENERATING OBJECT IDENTIFIER

RELATED APPLICATION

The present application claims priority to Chinese Patent Application No. 202410444362.3, filed Apr. 12, 2024, and entitled "Method, Device, and Computer Program Product for Generating Object Identifier," which is incorporated by reference herein in its entirety.

FIELD

The present disclosure relates to the field of computer software, and more particularly to a method, a device, and a computer program product for generating an object identifier.

BACKGROUND

In some scenarios, an enterprise can store an object list in a local system. In addition, the enterprise can register the objects in the object list to a remote system outside the enterprise. When registering an object in the remote system, the local system can transmit the identifier of the object and the configuration of the object to the remote system. The identifier of the object is unique relative to the configuration, in other words, objects with the same configuration have the same object identifier, while two objects having different identifiers means that they have different configurations.

The object identifier is generated based on the configuration of the object. For different types of objects, determination of which configurations of the objects can be used to generate object identifiers needs to follow the rule provided by remote system. Only when both the object identifier and the configuration of the object transmitted to the remote system conform to this rule can the object be successfully registered with the remote system. Upon successful registration, the local system can receive a response message of successful registration from the remote system, and then the enterprise can continue to perform the subsequent workflow related to the object.

SUMMARY

In a first aspect of embodiments of the present disclosure, a method for generating an object identifier is provided. The method includes obtaining a type of a target object from an object list. The method further includes classifying the target object into a corresponding registration category based on the type of the target object. The method further includes determining registration information for registering the target object in a remote system based on the corresponding registration category. In addition, the method further includes generating an object identifier for registering the target object in the remote system based on the type of the target object, the object list, and the registration information.

In a second aspect of embodiments of the present disclosure, an electronic device is provided. The electronic device includes at least one processor, and a memory coupled to the at least one processor and having instructions stored therein. The instructions, when executed by the at least one processor, cause the electronic device to perform actions including obtaining a type of a target object from an object list. The actions further include classifying the target object into a corresponding registration category based on the type of the target object. The actions further include determining registration information for registering the target object in a remote system based on the corresponding registration category. In addition, the actions further include generating an object identifier for registering the target object in the remote system based on the type of the target object, the object list, and the registration information.

In a third aspect of embodiments of the present disclosure, a computer program product is provided. The computer program product is tangibly stored on a non-transitory computer-readable medium and includes machine-executable instructions which, when executed by a machine, cause the machine to perform actions including obtaining a type of a target object from an object list. The actions further include classifying the target object into a corresponding registration category based on the type of the target object. The actions further include determining registration information for registering the target object in a remote system based on the corresponding registration category. In addition, the actions further include generating an object identifier for registering the target object in the remote system based on the type of the target object, the object list, and the registration information.

It should be understood that the content described in this Summary is neither intended to define key or essential features of embodiments of the present disclosure, nor intended to limit the scope of the present disclosure. Other features of the present disclosure will become readily understood from the additional description provided herein.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, identical or similar reference numerals represent identical or similar elements, in which:

FIG. 2 is a flow chart of a method for generating an object identifier according to some embodiments of the present disclosure;

FIG. 6 is a flow chart of an example process of generating an object identifier of a rack device according to some embodiments of the present disclosure;

FIG. 9 is a flow chart of an example process of generating an object identifier of a computer part and accessory according to some embodiments of the present disclosure.

DETAILED DESCRIPTION

Figure 1:
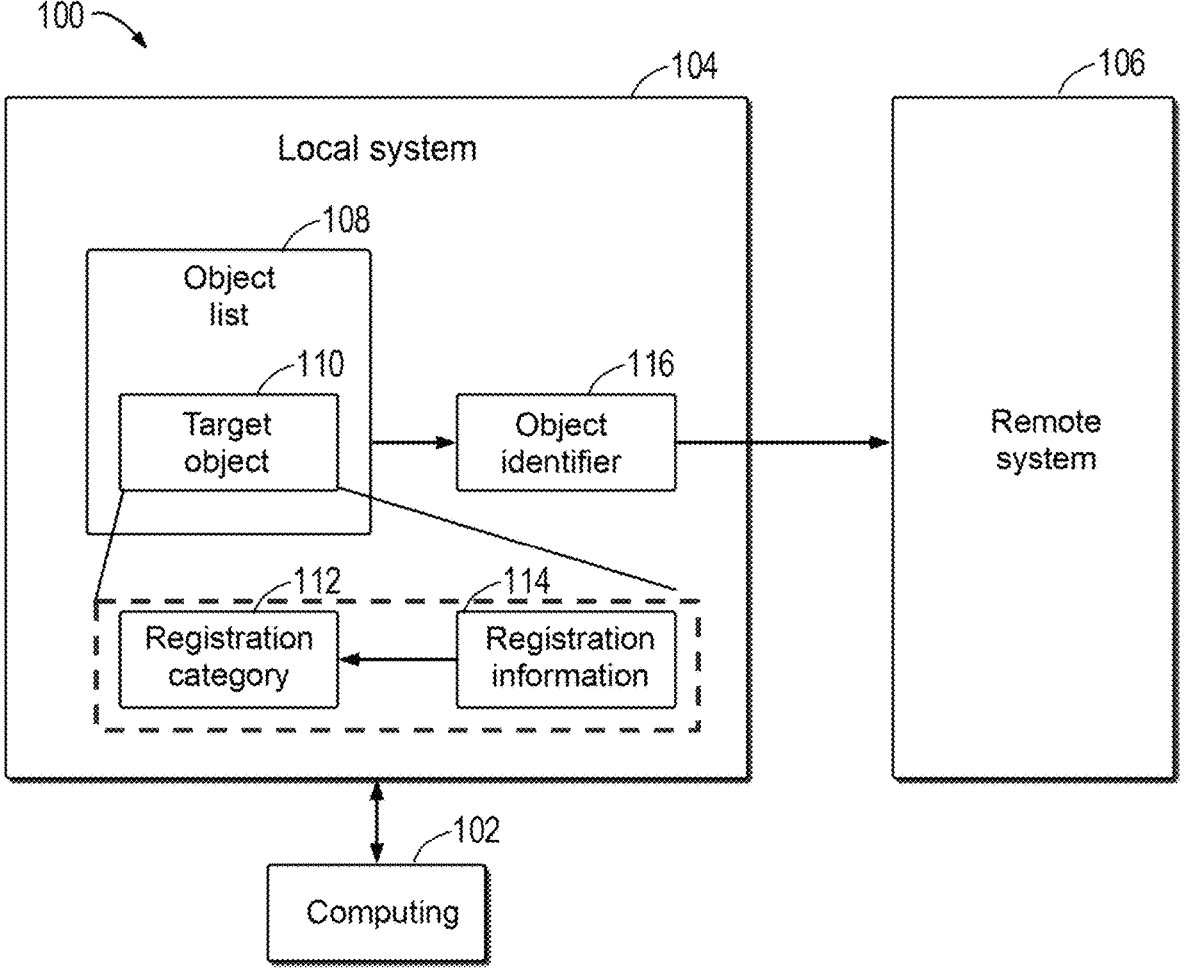
FIG. 1 is a schematic diagram of an example environment in which multiple embodiments of the present disclosure can be implemented.

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the scope of protection of the present disclosure.

In the description of embodiments of the present disclosure, the term "include" and similar terms should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit implementations may also be included below.

A blade server is a specially designed server to optimize space utilization and reduce energy consumption and is especially suitable for data centers and large-scale enterprise environments. In a blade server, a high degree of integration and space optimization can be achieved by vertically inserting multiple component servers (also called blade server modules) into a chassis. In some implementations, one or more switches may also be inserted into the chassis of the blade server in addition to the component servers. A rack device is a kind of large-scale device where servers, switches, or other network devices are installed in a rack in a modular form. A rack device supports vertical stacking of multiple network devices in a single rack, which effectively saves space and allows easy management. Computer parts and accessories are a collective name for all kinds of physical components that make up a computer or a server. These parts and accessories may be built-in or external, and they can be used to perform various functions from basic data processing to complex computation and graphics rendering. Computer parts and accessories may include, for example, a central processing unit (CPU), a memory, a hard disk drive, a graphics card, a sound card, a keyboard, a mouse, and the like.

The local system of an enterprise includes various object lists, some of which include blade servers, rack devices, or computer parts and accessories. In some cases, it is necessary to register the blade servers, rack devices, or computer parts and accessories with a remote system outside the enterprise and receive a response message of successful registration from the remote system in order to continue to perform the subsequent workflow related to these object lists in the local system. While these objects are registered in the remote system, the local system needs to generate object identifiers for these objects. Objects with the same configuration have the same object identifier, while two objects having different identifiers means that they have different configurations.

In a conventional solution, when generating object identifiers for blade servers, rack devices, and computer parts and accessories, it is necessary to manually identify configurations of these objects, then determine object identifiers for these objects according to the rule provided by the remote system, and manually enter them into the local system. This method is very inefficient, which makes the process often take days or weeks, leading to delay of the subsequent workflow. In addition, relying on manual data entry increases the risk of human errors (e.g., incorrect information is entered due to spelling mistakes), which may result in the failure to successfully register these objects in the remote system, thus delaying the subsequent workflow associated with these objects. With the addition of new components or accessories, lack of an automation system may make it increasingly difficult to generate and assign object identifiers, which leads to more and more time consumed in this process. In addition, creating object identifiers manually involves consumption of a lot of time and energy of an operator, resulting in waste of human resources.

In view of this, embodiments of the present disclosure provide a solution that can obtain the type of a target object from an object list of a local system. Then, this solution can classify the target object into a corresponding registration category based on the type of the target object. After determining the registration category corresponding to the target object, registration information for registering the target object in a remote system can be determined based on the corresponding registration category. Then, an object identifier for registering the target object in the remote system can be generated based on the type of the target object, the object list, and the registration information.

In this way, object identifiers can be generated adaptively for different types of objects, so that the efficiency of generating object identifiers can be improved, the time spent on registering these objects in the remote system can be reduced, and the speed of performing the workflow can be improved. In addition, this method can also reduce the errors caused by human operations, improve the accuracy of the generated object identifiers, reduce the anomalies in the workflow, and improve the stability of the workflow.

FIG. 1 is a schematic diagram of an example environment 100 in which multiple embodiments of the present disclosure can be implemented. As shown in FIG. 1, the environment 100 includes a computing device 102, which may be any device with computing power or processing power. For example, the computing device 102 may be a local server, a cloud server, a desktop computer, a laptop computer, a tablet computer, a mobile phone, a personal assistant, a smart wearable device, and the like. In the environment 100, a local system 104 can run on the computing device 102, and the local system 104 is a business system within an enterprise that has enterprise data stored thereon. It should be noted that it is not intended to limit the deployment mode of the local system 104, and the local system 104 may be deployed on a local server of the enterprise or on a cloud server. An object list 108 can be stored in the local system 104, and the local system 104 can perform a workflow associated with the object list 108. The object list 108 may include a target object 110, which may be one or more objects. In embodiments of the present disclosure, the target object 110 may be, for example, a blade server, a rack device, or a computer part and accessory.

In some scenarios, in order to perform the workflow associated with the object list 108, the local system 104 needs to register the target object 110 in a remote system 106. The remote system 106 is an external system for the enterprise. The remote system 106 can receive various messages from the local system 104 (e.g., a message requesting registration of the target object 110), process these messages accordingly, and then return response messages for the received messages (e.g., a message of successful registration of the target object 110) to the local system 104. Upon receiving the response message of successful registration from the remote system 106, the local system 104 can continue to perform the subsequent workflow associated with the object list 108.

For data standardization, the remote system 106 can provide a rule for registering objects thereon, which may include the registration category of an object and registration information (also called registration elements) corresponding to the registration category. The local system 104 can classify the target object 110 into a registration category 112 based on the rule provided by the remote system 106, and then can obtain registration information 114 corresponding to the registration category 112. In the environment 100, the local system 104 can generate configuration information for the target object based on the registration information 114, and then generate an object identifier 116 based on the configuration information of the target object. The object identifier 116 is the unique identifier of the configuration, that is, objects with the same configuration have the same object identifier, while objects with different configurations have different object identifiers. The local system 104 can then send the object identifier 116 to the remote system 106 for registering the target object 110. In addition, after the object identifier 116 is successfully registered with the remote system 106, when the local system is performing the workflow associated with another object list, if the configuration of an object in the object list is the same as that of the target object 110, the local system 104 can assign the registered object identifier 116 to the object, so that the subsequent workflow associated with the object list can be immediately performed.

In this way, the local system 104 can automatically generate object identifiers for different types of objects, so that the efficiency of generating object identifiers can be improved, the time spent on registering the target object 110 in the remote system 106 can be reduced, and the speed of performing the workflow can be improved. In addition, this method can also reduce the errors caused by human operations, improve the accuracy of the generated object identifier 116, reduce the anomalies in the workflow, and improve the stability of the workflow.

FIG. 2 is a flow chart of a method 200 for generating an object identifier according to some embodiments of the present disclosure. The method 200 may be performed, for example, by the local system 104 running on the computing device 102 in FIG. 1. As shown in FIG. 2, at block 202, the method 200 can obtain a type of a target object from an object list. For example, in the environment 100 shown in FIG. 1, the local system 104 can obtain the object list 108, which can include multiple attributes associated with it and multiple attributes associated with the target object 110. The multiple attributes associated with the target object 110 can include the type of the target object. The type of the object may be, for example, a blade server, a rack device, a computer part and accessory, or the like.

At block 204, the method 200 can classify the target object into a corresponding registration category based on the type of the target object. For example, in the environment 100 shown in FIG. 1, the local system 104 can classify the target object 110 into the registration category 112 based on the type of the target object 110. For example, in the case where the type of the target object 110 is a blade server, it is necessary to classify the blade server into the registration category provided by the remote system 106. However, the blade server may not be included in the registration category list provided by the remote system 106, so the computing device 102 can classify the target object 110 into the registration category 112 (e.g., mainframe) based on the type of the target object 110 (e.g., blade server).

At block 206, the method 200 can determine registration information for registering the target object in the remote system based on the corresponding registration category. For example, in the environment 100 shown in FIG. 1, the local system 104 can determine the registration information 114 based on the registration category 112. For example, in the registration category list provided by the remote system 106, multiple registration categories may be included, and each of the multiple registration categories may have registration information corresponding thereto (e.g., product name, type, configuration, brand, model, and the like). After classifying the target object 110 into the registration category 112, the local system 104 can look up the registration category list for the registration category 112, so that the registration information 114 corresponding to the registration category 112 can be determined.

At block 208, the method 200 can generate the object identifier for registering the target object in the remote system based on the type of the target object, the object list, and the registration information. For example, in the environment 100 shown in FIG. 1, the local system 104 can generate the object identifier 116 based on the type of the target object 110, the contents of the object list 108, and the registration information 114 corresponding to the target object 110. For example, based on the type of the target object 110, the local system 104 can determine a corresponding way to generate the object identifier. As blade servers, rack devices, and computer parts and accessories have different attributes, and there are some differences in the forms of the object lists 108 thereof, different processes can be respectively performed for the object list including blade servers, the object list including rack devices, and the object list including computer parts and accessories, and these processes can generate object identifiers based on the contents of the object lists and the registration information corresponding to the objects in different ways.

In this way, object identifiers can be generated adaptively for different types of objects, so that the efficiency of generating object identifiers can be improved, the time spent on registering these objects in the remote system can be reduced, and the speed of performing the workflow can be improved. In addition, this method can also reduce the errors caused by human operations, improve the accuracy of the generated object identifiers, reduce the anomalies in the workflow, and improve the stability of the workflow.

Figure 3:
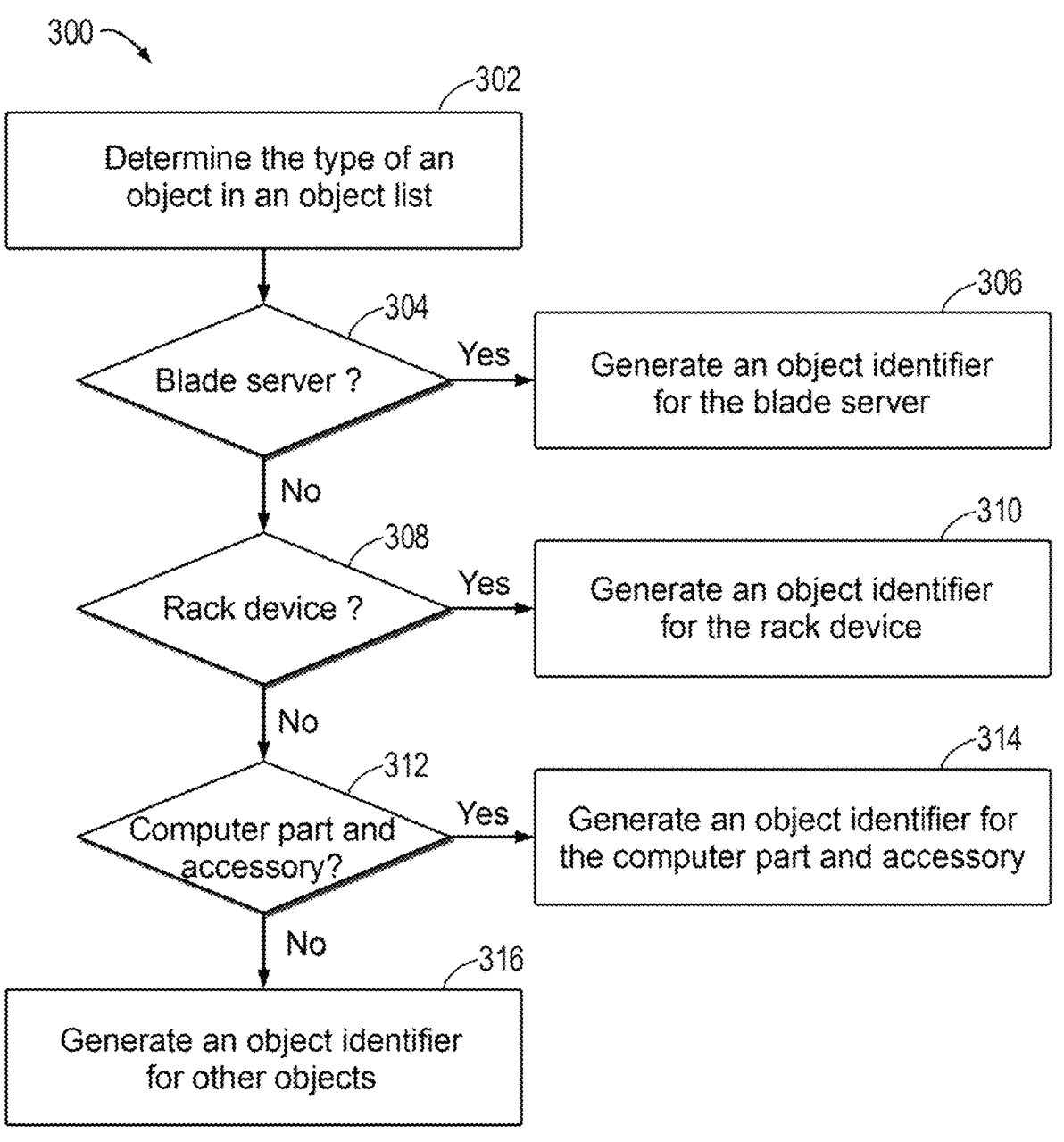
FIG. 3 is a flow chart of an example process of generating object identifiers for blade servers, rack devices, and computer parts and accessories by classifying objects according to some embodiments of the present disclosure.

FIG. 3 is a flow chart of an example process 300 of generating object identifiers for blade servers, rack devices, and computer parts and accessories by classifying objects according to some embodiments of the present disclosure. As shown in FIG. 3, at block 302, the process 300 can determine the type of an object in an object list. In embodiments of the present disclosure, the type of an object may include a blade server, a rack device, and a computer part and accessory. For example, the local system can store the object list in a structured manner, and the stored data can include, for example, the number of the object list, the type of the object list (e.g., whether it is a child object list of another object list), the objects included in the object list, and the like. The objects included in the object list can also be stored in a structured manner, and the stored data can include, for example, the product name of the object, the attributes of the object, and the like. The local system can determine the type of the object based on the stored data of the object.

At block 304, the process 300 can determine whether the type of the object is a blade server. The blade server may include a chassis in which component servers (i.e., "blades") can be installed. Switches may also be included in the chassis of some blade servers. If the object is a blade server, the process 300 proceeds to block 306. At block 306, the local system can generate an object identifier for the blade server. If the object is not a blade server, the process 300 proceeds to block 308. At block 308, the local system can determine whether the object is a rack device. The rack device can include a rack in which various network devices such as servers, switches, and even blade servers can be installed. If the object is a rack device, the process 300 proceeds to block 310. At block 310, the local system can generate an object identifier for the rack device. If the object is not a rack device, the process 300 proceeds to block 312. At block 312, the local system can determine whether the object is a computer part and accessory. The computer part and accessory may include a CPU, a memory, a hard disk drive, a graphics card, a sound card, a keyboard, a mouse, and the like. If the object is a computer part and accessory, the process 300 proceeds to block 314. At block 314, the local system can generate an object identifier for the computer part and accessory. If the object is not a computer part and accessory, the process 300 proceeds to block 316. At block 316, the local system can generate the object identifier of the object using the method for generating the object identifier for other objects.

In this way, object identifiers can be generated adaptively for different types of objects, so that the efficiency of generating object identifiers can be improved. In addition, the whole process is entirely automatically performed by the local system, which can reduce the errors caused by human operations and improve the accuracy of the generated object identifiers.

In some embodiments, for the case where the type of the target object is a blade server, in order to generate the object identifier of the target object, a parent object constituting the target object can be determined in the object list, and a group of child objects associated with the parent object can be determined in the object list. Then, the object identifier of the target object can be generated based on the parent object and the group of child objects. In some embodiments, it can be determined in the object list whether the group of child objects includes a switch. If the group of child objects includes a switch, the model and number of the switches can be determined. Then, the configuration information of the group of child objects can be determined based on the model and number of the switches. In some embodiments, it can be determined in the object list whether the group of child objects includes a non-switch object, and if the group of child objects does not include a non-switch object, an error message can be prompted. If the group of child objects includes a non-switch object, the model and number of the non-switch objects can be determined. Then, the configuration information of the group of child objects can be determined based on the model and number of the non-switch objects. In some embodiments, the model of the parent object can be determined, and then the object identifier of the target object can be generated based on the model of the parent object, the model and number of the switches, and the model and number of the non-switches.

Figure 4:
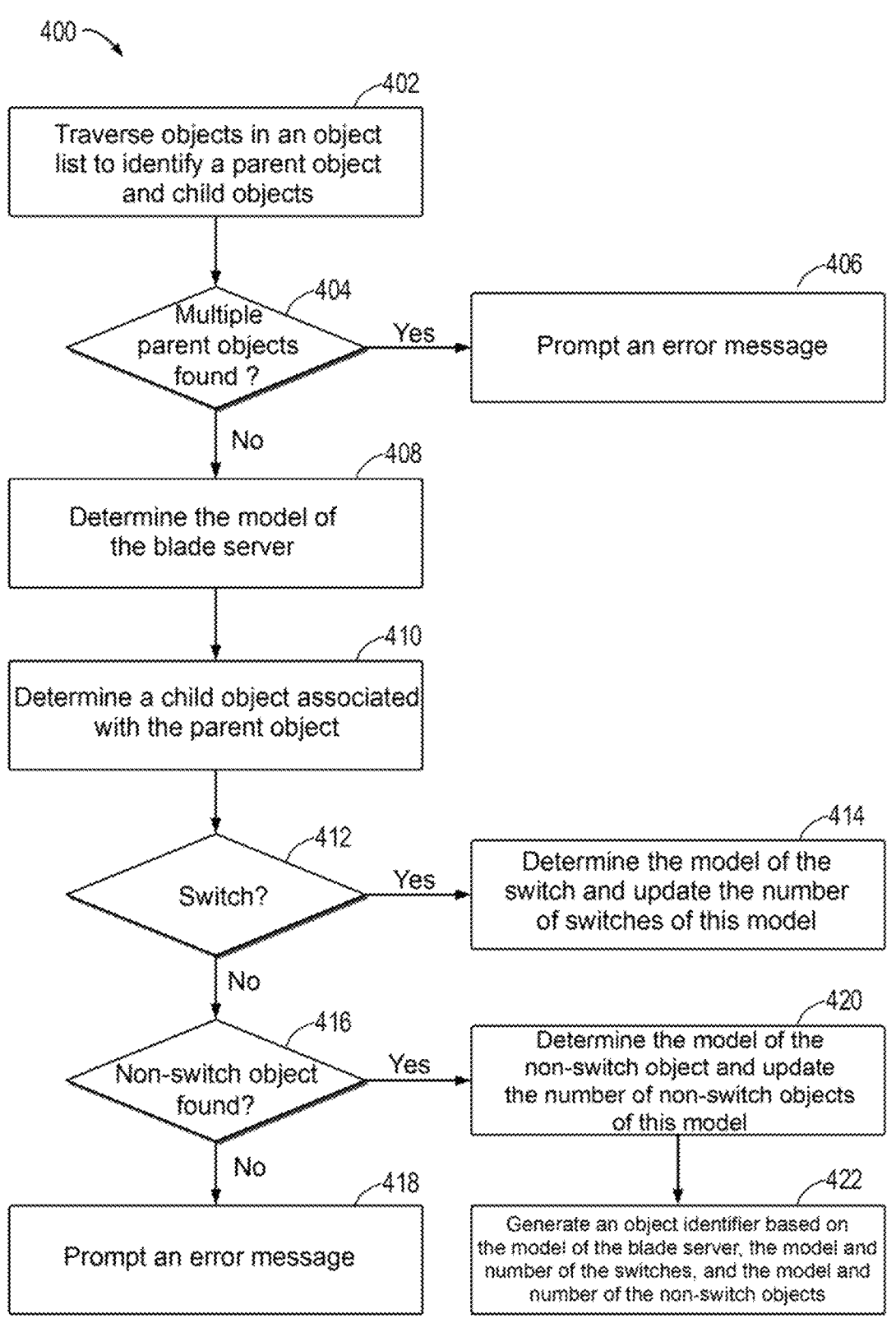
FIG. 4 is a flow chart of an example process of generating an object identifier of a blade server according to some embodiments of the present disclosure.

FIG. 4 is a flow chart of an example process 400 of generating an object identifier of a blade server according to some embodiments of the present disclosure. As shown in FIG. 4, at block 402, the local system can traverse the objects in the object list to identify the parent object and the child objects. The object list of the blade server includes a chassis (e.g., parent object), and the chassis includes various component servers or switches (e.g., child objects). In the registration information corresponding to the blade server, the information associated with the blade server that is required to be transmitted to the remote system includes the model of the blade server, the model and number of the component servers, and the model and number of the switches. Therefore, the local system can identify information corresponding to the chassis and information corresponding to the component servers or switches in the object list.

At block 404, the local system can determine whether multiple parent objects (e.g., multiple chassis) are found in the object list. If multiple parent objects are found, the process 400 proceeds to block 406. At block 406, the local system can prompt an error message. For example, the local system can provide the error message by means of a user interface, a voice, a mail, a short message, and the like to inform a system administrator that there are multiple chassis in the object list. As each blade server can only include one chassis, in this way, the administrator can find an abnormal object list in time, so that this object list can be handled in time.

If only one parent object is found, the process 400 proceeds to block 408. At block 408, the local system can determine the model of the blade server. For example, the local system can look up the object composition list (e.g., bill of materials) corresponding to the chassis to determine the model of the blade server (e.g., "BS001"). At block 410, the local system can determine a child object associated with the parent object. At block 412, if the child object is a switch, the process 400 proceeds to block 414. At block 414, the local system can determine the model of the switch (e.g., "SW001") and update the number of found switches of this model (e.g., 2). Returning to block 412, if the child object is not a switch, the process 400 proceeds to block 416.

At block 416, the local system can determine whether a non-switch object (e.g., a component server) is found. If no non-switch object is found, the process 400 proceeds to block 418. At block 418, the local system can prompt an error message. For example, the local system can provide an error message by means of a user interface, a voice, a mail, a short message, and the like to inform the system administrator that there is no non-switch object in the blade server. As the blade server should include at least one non-switch object, in this way, the system administrator can find an abnormal object list in time, so that the object list can be handled in time. Returning to block 416, if a non-switch object is found, the process 400 proceeds to block 420. At block 420, the local system can determine the model of the non-switch object (e.g., "SV001") and update the number of non-switches of this model (e.g., 10).

At block 422, the local system can generate the object identifier of the blade server based on the model of the blade server, the model and number of the switches, and the model and number of the non-switch objects. In some embodiments, the local system can use a multiplication sign (i.e., "×") to connect the model of the child object and the number of child objects of this model together to represent the configuration information of the child object. In some embodiments, the local system can use a comma (i.e., ",") to connect the configuration information of multiple child objects together to form the configuration information of a group of child objects. In some embodiments, the local system can use a vertical line (i.e., "|") to connect the model of the blade server and the configuration information of a group of child objects to represent the configuration information of the blade server. In some embodiments, the local system can also use a vertical line to connect the configuration information of the blade server and the brand of the blade server to form all information for generating the object identifier. For example, the character string "BS001|SV001× 10, SW001×2|DELL" can represent a blade server of model "BS001," which includes 10 component servers of model "SV001" and 2 switches of model "SW001" in its chassis, and the brand of the blade server is "DELL." The local system can then generate an object identifier (e.g., "FG000000000001") for the blade server by applying a specific rule or algorithm to the character string.

In this way, the object identifier of the blade server can be automatically generated for the specific structure of the object list of the blade server, and the process is entirely automatically performed by the local system according to the predetermined flow, so that the efficiency of generating the object identifier of the blade server can be improved, and the accuracy of the generated object identifier of the blade server can also be improved.

Figure 5:
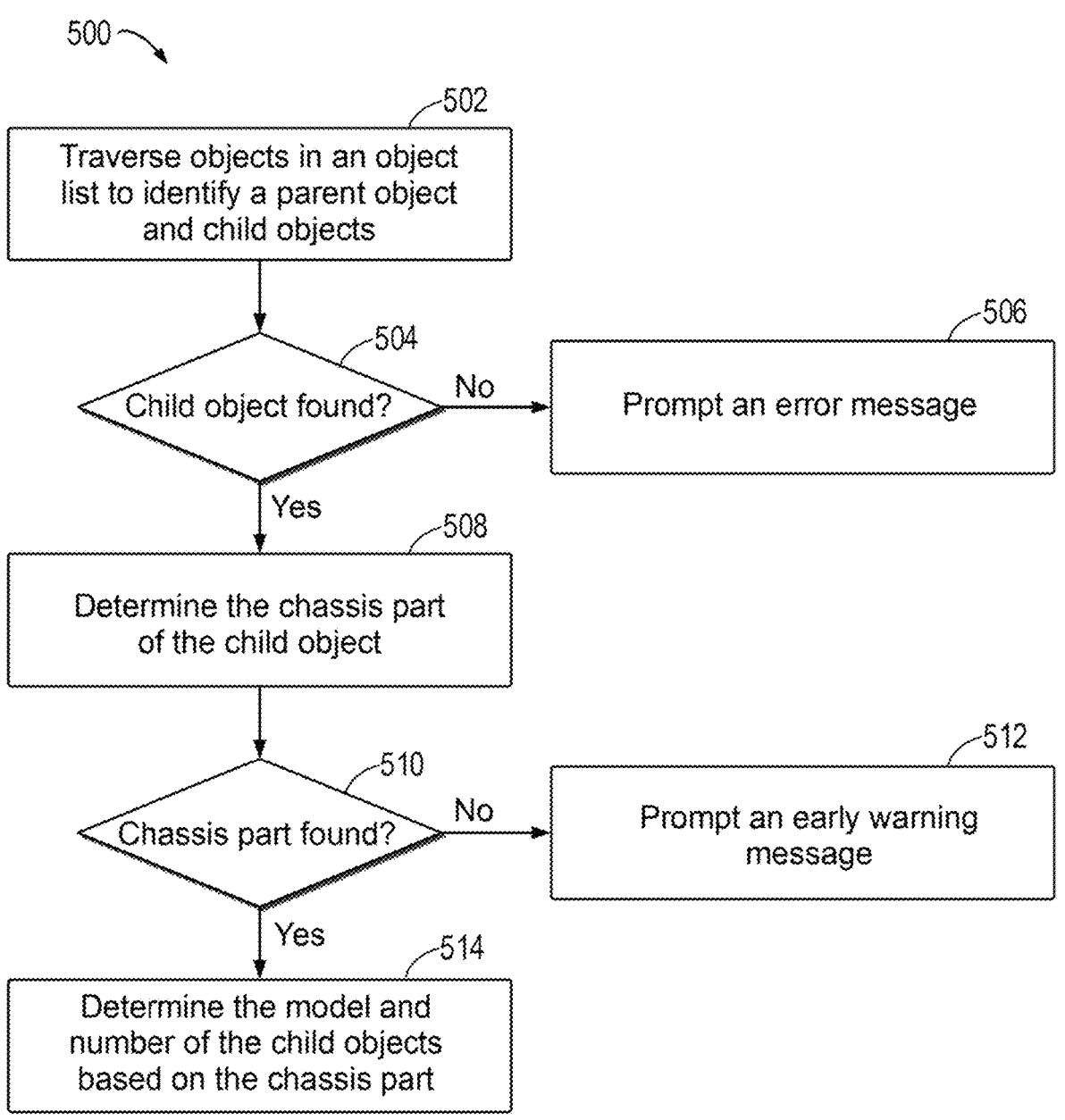
FIG. 5 is a flow chart of an example process of determining the model and number of child objects based on the chassis part of the child objects according to some embodiments of the present disclosure.

In some embodiments, when the type of the target object is a blade server, the chassis part of a group of child objects can be found in the object list. If the chassis part of the child objects is not found, an early warning message can be prompted. If the chassis part of the child objects is found, the model and number of the child objects can be determined based on the chassis part. FIG. 5 is a flow chart of an example process 500 of determining the model and number of child objects based on the chassis part of the child objects according to some embodiments of the present disclosure. As shown in FIG. 5, at block 502, the local system can traverse the objects in the object list to identify the parent object and the child objects. The parent object may be the chassis of the blade server, and the child object may be, for example, a switch installed in the chassis. At block 504, the local system can determine whether a child object is found in the object list, and if no child object is found, the process 500 proceeds to block 506. At block 506, the local system can prompt an error message. As the object list is an object list for the blade server, it includes at least one child object (e.g., a component server or a switch). If no child object is found in the object list, the local system can provide an error message by means of, for example, a user interface, a voice, a mail, a short message, and the like, to inform the system administrator that the object list of the blade server does not include child objects. In this way, the administrator can identify an abnormal object list in time, so that the list can be handled in time.

Returning to block 504, if a child object can be found in the object list, the process 500 proceeds to block 508. At block 508, the local system can determine the chassis part of the child object. The chassis part of the child object may include the model of the child object. The switches and component servers in the blade server have their own chassis parts, so the model of the switches or component servers can be determined based on their chassis parts. However, a child object (e.g., hard disk) without a chassis part may be included in the object list. Therefore, at block 510, the local system can determine whether the chassis part of the child object is found. If the chassis part of the child object is not found, the process 500 proceeds to block 512.

At block 512, the local system can prompt an early warning message. As the object list of the blade server usually does not include a child object without a chassis part (e.g., the blade server usually does not have a separate hard disk), when a child object without a chassis part is found in the object list of the blade server, this means that the child object may probably be added to the object list of the blade server by mistake. At this time, for example, the local system can provide an early warning message by means of a user interface, a voice, a mail, a short message, and the like to inform the system administrator to check whether the object list is abnormal. In this way, the administrator can be reminded to check the suspicious object list, so that anomalies can be eliminated in advance, and the stability of the system can be improved.

Returning to block 510, if the chassis part of the child object can be found, the process 500 proceeds to block 514. At block 514, the local system can determine the model and number of the child objects based on the chassis part of the child objects. The determined model and number of the child objects can be used to generate the object identifier of the blade server. In this way, the process 500 can capture the associative relationship between the parent object and the child object at the object list level (e.g., the inclusive relationship between the chassis of the parent object and the chassis of the child object), and obtain the model and number of the child objects from the chassis part of the child objects in the object list without the necessity to determine the model and number of the child objects based on the object composition list of the child objects. In this way, the model and number of the child objects obtained via the object list can be used to verify the model and number of the child objects obtained via the object composition list, so that the accuracy of the system can be improved.

In some embodiments, in the case where the type of the target object is a rack device, if a request to add a new object identifier in the local system is received, it can be determined whether the configuration information corresponding to the new object identifier is the same as the existing configuration information. If they are the same, the existing configuration information can be deleted or updated. FIG. 6 is a flow chart of an example process 600 of generating an object identifier of a rack device according to some embodiments of the present disclosure. As shown in FIG. 6, at block 602, the local system can receive a request to add a new object identifier. The request may include a new object identifier and corresponding new configuration information. For example, the new configuration information may include the model of the rack device and the model and number of the network devices included in the rack device. At block 604, the local system can determine whether the configuration information corresponding to the object identifier already exists in the local system. For example, the existing object identifier and corresponding configuration information may be stored in the database of the local system. The local system can look up in the database to determine whether there is the same configuration information as the new configuration information. At block 606, if the same configuration information as the new configuration information already exists, the process 600 proceeds to block 608.

At block 608, the local system can delete or update the existing configuration information. In some embodiments, when deleting the existing configuration information, it can be checked whether the configuration information or the corresponding object identifier is associated with an existing object list. If the configuration information is associated with an existing object list, the status of the configuration information can be set as invalid. If the configuration information is not associated with an existing object list, the configuration information can be deleted.

Returning to block 606, if there is no configuration information that is the same as the new configuration information, the process 600 proceeds to block 610. At block 610, the local system can save the configuration information of the rack device in the database. At block 612, the local system can generate the object identifier of the rack device based on the saved configuration information. At block 614, the local system can send a registration request to the remote system. The registration request may include the object identifier and corresponding configuration information of the rack device. At block 616, if the local system receives a response of successful registration from the remote system, the process 600 proceeds to block 618. At block 618, the local system can set the configuration information to a valid status. If the local system does not receive a response of successful registration from the remote system, the process 600 proceeds to block 620. At block 620, the local system can set the configuration information to an invalid status.

In this way, the object identifier of the rack device can be automatically generated according to the specific structure of the object list of the rack device, and the process is entirely automatically performed by the local system according to the predetermined flow, so that the efficiency of generating the object identifier of the rack device can be improved, and the accuracy of the generated object identifier of the rack device can also be improved.

Figure 7:
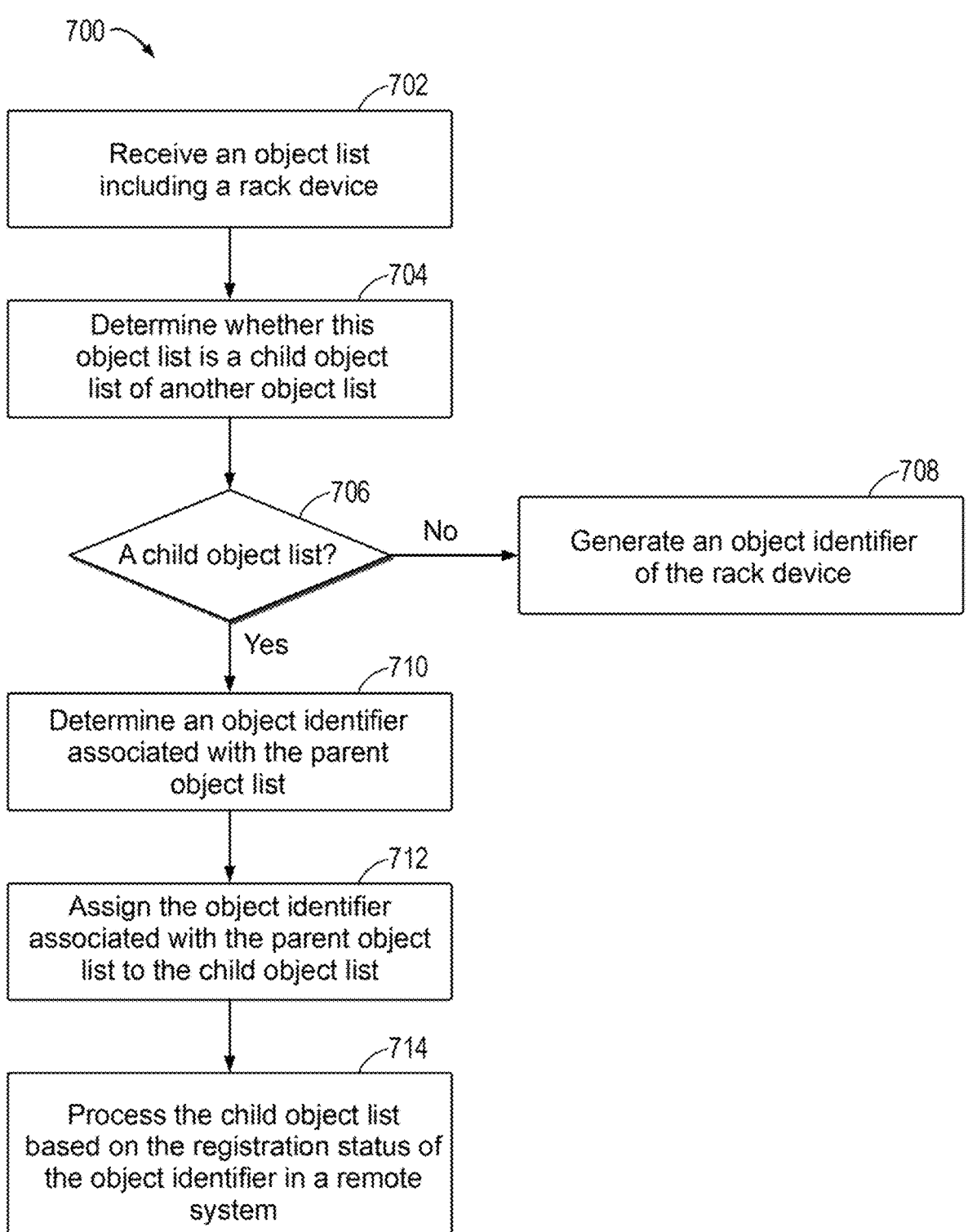
FIG. 7 is a flow chart of an example process of generating an object identifier of a rack device in the case where the object list is one of multiple child object lists split from a parent object list according to some embodiments of the present disclosure.

In some embodiments, in the case where the type of the target object is a rack device, if a new object list is received, it can be determined whether this object list is a child object list of another object list. If this object list is a child object list of another object list, the object identifier associated with the parent object list can be assigned to this new object list. FIG. 7 is a flow chart of an example process 700 of generating an object identifier of a rack device in the case where the object list is one of multiple child object lists split from a parent object list according to some embodiments of the present disclosure. As shown in FIG. 7, at block 702, the local system receives an object list including a rack device. At block 704, the local system can determine whether this object list is a child object list of another object list. In other words, the local system can determine whether this object list is generated by splitting the object list of a rack device into multiple child object lists. Due to the bulky volume and complex structure of the rack device, various complex network devices may also be installed in the rack. Therefore, the object list of the rack device can be split into multiple child object lists, and each child object list can include some of the network devices in the rack. In this way, the objects in each child object list can be tested separately, and the subsequent workflow can be performed independently on the objects that have completed the test without waiting for completion of test of all the objects in the child object list. Therefore, the object lists among the multiple child object lists may have their respective completion statuses. If an object list is a child object list of another object list, the attributes of the object list can include the identifier of its parent object list, with which its parent object list can be tracked.

At block 706, if the object list is not a child object list of another object list, the process 700 proceeds to block 708. At block 708, the local system can generate an object identifier of the rack device based on the object list. If the object list is the child object list of another object list, the process 700 proceeds to block 710. At block 710, the local system can determine the object identifier associated with the parent object list. At block 712, the local system can assign the object identifier associated with the parent object list to the child object list. At block 714, the local system can process the child object list based on the registration status of the object identifier associated with the parent object list in the remote system. If the object identifier has been successfully registered, performance of the subsequent workflow on this child object list can be continued independently.

In this way, if the object list of a rack device is split into multiple child object lists, the objects in these child object lists can be tested separately, and the workflow associated with the child object lists can be executed separately. As the test cycle of the network devices in the rack device is usually very long, such a parallel execution mode can save a lot of time. In addition, these child object lists all have the same object identifier, which corresponds to the configuration information of the rack device in the parent object list. Therefore, by using the object identifier, the workflow performance status of individual child object lists can be tracked, and the status of the parent object list of the rack device can be set as completed only when performance of the workflow of all the child object lists has been entirely completed. In this way, the accuracy and stability of the system can be improved.

Figure 8:
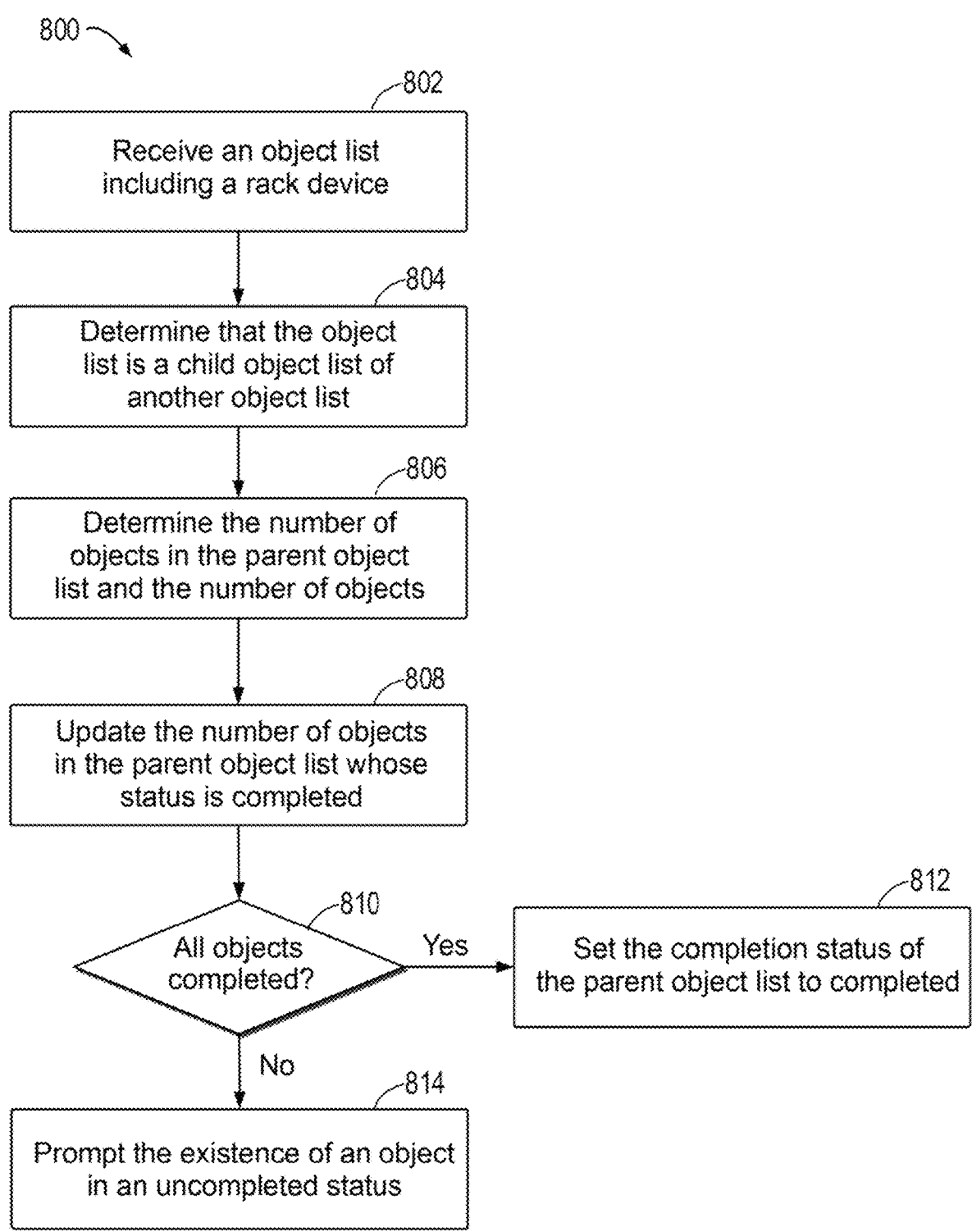
FIG. 8 is a flow chart of an example process of determining a completion status of a parent object list based on an object identifier according to some embodiments of the present disclosure.

In some embodiments, when the type of the target object is a rack device, the number of objects in the parent object list, the number of objects in the parent object list whose status is completed, and the number of objects in the new object list can be obtained. If the number of objects in the parent object list is greater than the sum of the number of objects in the parent object list in the completed status and the number of objects in the new object list, the status of the parent object list can be prompted as uncompleted. FIG. 8 is a flow chart of an example process 800 of determining a completion status of a parent object list based on an object identifier according to some embodiments of the present disclosure. As shown in FIG. 8, at block 802, the local system can receive an object list including a rack device. At block 804, the local system can determine that the object list is a child object list of another object list. In other words, the local system can determine whether this object list is generated by splitting the object list of a rack device into multiple child object lists. For example, it can be determined that the object list is a child object list based on whether there is the identifier of the parent object list in the object list.

At block 806, the local system can determine the number of objects in the parent object list and the number of objects in the current child object list. At block 808, when the completion status of the child object list is completed, the local system can update the number of completed objects in the parent object list, where "completed object" means that the workflow of the child object list including the object has been completed. At block 810, if all the objects in the parent object list have been completed, the process 800 proceeds to block 812. At block 812, the local system can set the completion status of the parent object list to completed. If there is an uncompleted object in the parent object list, that is, the number of objects in the parent object list is greater than the number of objects in all completed child object lists, the process 800 proceeds to block 814. At block 814, the local system can prompt the existence of an object in an uncompleted status.

In this way, when the workflow of the child object list is completed, the system administrator can know that the parent object list thereof has not been completed, so that the uncompleted child object list can be tracked and processed in time to avoid missing the uncompleted child object list, thereby improving the reliability of the system.

The object list of computer parts and accessories can usually include multiple objects, but the remote system only requires registration of one of the objects. In some embodiments, for the case where the target object is a computer part and accessory, when determining the type of the target object, multiple candidate objects can be determined based on the object list. Then, a target attribute value of each of the multiple candidate objects can be determined. Then, the candidate object with the greatest target attribute value among the multiple candidate objects can be determined as the target object. Then, the type of the target object can be determined. FIG. 9 is a flow chart of an example process 900 of generating an object identifier of a computer part and accessory according to some embodiments of the present disclosure. As shown in FIG. 9, at block 902, the local system can traverse the object list to determine multiple candidate objects in the object list. For example, the multiple candidate objects may include a hard disk, a mouse, a keyboard, and the like. At block 904, the local system can determine a target attribute value of each of the multiple candidate objects. For example, the target attribute value may be a value, that is, the local system can determine the value of each candidate object. At block 906, the local system can determine the candidate object with the greatest target attribute value as the target object. For example, the local system can determine the candidate object with the highest value as the target object. For example, if the value of the hard disk is higher than that of the mouse and the keyboard, the hard disk can be determined as the target object.

At block 908, the local system can obtain the configuration information of the target object. For example, the configuration information may include the name or description of the object, as well as the specification, number, and other attributes of the object. At block 910, if there is a null value in the configuration information of the object, the process 900 proceeds to block 912. At block 912, the local system can prompt an error message to inform the system administrator that the configuration information of the computer parts and accessories is abnormal, which may lead to the failure of registration. In this way, the system administrator can check the configuration information of the part and accessory in time to avoid generating an invalid object identifier, which leads to failure of registration at the remote system. If there is no null value in the configuration information of the object, the process 900 proceeds to block 914. At block 914, the local system can generate an object identifier based on the configuration information of the target object.

In this way, the object identifier of the computer part and accessory can be automatically generated according to the specific structure of the object list of the computer parts and accessories, and this process is entirely automatically performed by the local system according to the predetermined flow, so that the efficiency of generating the object identifier of the computer part and accessory can be improved and the accuracy of the generated object identifier of the computer part and accessory can be improved.

Figure 10:
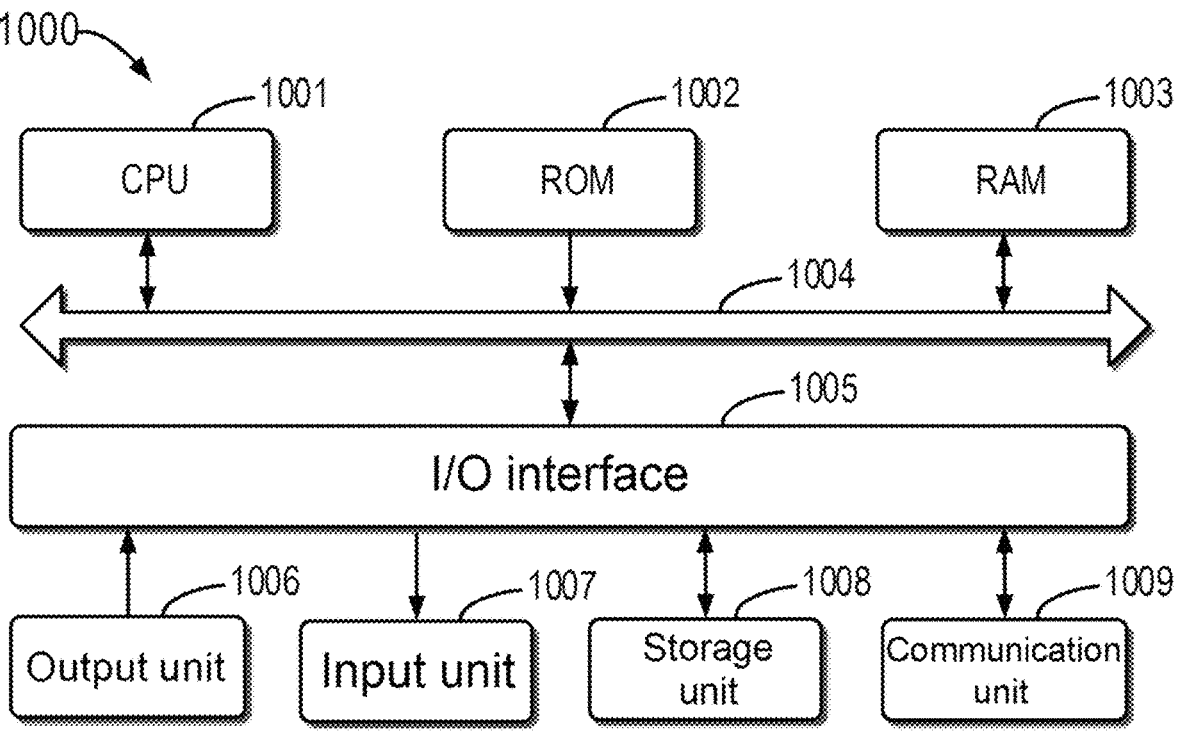
FIG. 10 is a block diagram of a device that can implement multiple embodiments of the present disclosure.

FIG. 10 is a block diagram of an example device 1000 that can be used to implement embodiments of the present disclosure. For example, the computing device 102 shown in FIG. 1 may be the example device 1000 shown in FIG. 10. As illustrated in the figure, the device 1000 includes a computing unit 1001, illustratively comprising at least one central processing unit (CPU), that can perform various appropriate actions and processing according to computer program instructions stored in a read-only memory (ROM) 1002 or computer program instructions loaded from a storage unit 1008 to a random access memory (RAM) 1003. Various programs and data required for the operation of the device 1000 may also be stored in the RAM 1003. The computing unit 1001, the ROM 1002, and the RAM 1003 are connected to each other through a bus 1004. An input/output (I/O) interface 1005 is also connected to the bus 1004.

Multiple components in the device 1000 are connected to the I/O interface 1005, including: an output unit 1006, such as various types of displays and speakers; an input unit 1007, such as a keyboard and a mouse; the storage unit 1008, such as a magnetic disk and an optical disc; and a communication unit 1009, such as a network card, a modem, and a wireless communication transceiver. The communication unit 1009 allows the device 1000 to exchange information/data with other devices via a computer network, such as the Internet, and/or various telecommunication networks.

The computing unit 1001 may be various general-purpose and/or special-purpose processing components with processing and computing power. Some examples of the computing unit 1001 include, but are not limited to, one or more instances of the above-noted CPU, graphics processing units (GPUs), various specialized artificial intelligence (AI) computing chips, various computing units for running machine learning model algorithms, digital signal processors (DSPs), and any appropriate processors, controllers, microcontrollers, and the like. The computing unit 1001 performs various methods and processes described above, such as the method 200. For example, in some embodiments, the method 200 may be implemented as a computer software program that is tangibly included in a machine-readable medium, such as the storage unit 1008. In some embodiments, part or all of the computer program may be loaded and/or installed onto the device 1000 via the ROM 1002 and/or the communication unit 1009. When the computer program is loaded to the RAM 1003 and executed by the computing unit 1001, one or more steps of the method 200 described above can be performed. Alternatively, in other embodiments, the computing unit 1001 may be configured to implement the method 200 in any other suitable manner (such as by means of firmware).

The functions described herein can be performed at least in part by one or more hardware logic components. For example, without limitation, example types of available hardware logic components include: a field programmable gate array (FPGA), an application specific integrated circuit (ASIC), an application specific standard product (ASSP), a system on chip (SOC), a complex programmable logic device (CPLD), and the like.

Program codes for implementing the method of the present disclosure may be written by using one programming language or any combination of multiple programming languages. The program codes may be provided to a processor or controller of a general purpose computer, a special purpose computer, or another programmable data processing apparatus, such that the program codes, when executed by the processor or controller, implement the functions/operations specified in the flow charts and/or block diagrams. The program codes may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination thereof. Additionally, although operations are depicted in a particular order, this should not be construed as an indication that such operations are required to be performed in the particular order shown or in a sequential order, or that all illustrated operations should be performed to achieve desirable results. In certain environments, multitasking and parallel processing may be advantageous. Likewise, although the above discussion contains several specific implementation details, these are not to be construed as limitations to the scope of the present disclosure. Certain features that are described in the context of separate embodiments may also be implemented in combination in a single implementation. In contrast, various features that are described in the context of a single implementation may also be implemented in multiple implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method, comprising:

obtaining, by at least one processor of a local system, a type of a target object from an object list stored in a memory of the local system;

classifying, by the at least one processor of the local system, the target object into a corresponding registration category based on the type of the target object;

determining, by the at least one processor of the local system, registration information for registering the target object in a remote system based on the corresponding registration category, wherein the local system is configured to communicate with the remote system over at least one network, the registration information being obtained at least in part by the local system from the remote system over the at least one network;

generating, by the at least one processor of the local system, an object identifier for registering the target object in the remote system based on the type of the target object, the object list, and the registration information;

transmitting, under control of the at least one processor of the local system, the object identifier over the at least one network from the local system to the remote system for registration of the target object therein; and responsive to receipt in the local system, from the remote system, an indication of successful registration of the target object in the remote system utilizing the object identifier, initiating, by the at least one processor of the local system, at least a portion of at least one workflow utilizing the object identifier in the local system.

2. The method according to claim 1, wherein the type of the target object is a blade server, and generating the object identifier of the target object based on the type of the target object, the object list, and the registration information comprises:

determining a parent object constituting the target object in the object list;

determining a group of child objects associated with the parent object in the object list; and generating the object identifier of the target object based on the parent object and the group of child objects.

3. The method according to claim 2, wherein the parent object is a chassis of a blade server, and determining configuration information of the group of child objects associated with the parent object in the object list comprises:

determining whether the group of child objects comprises a switch in the object list;

in response to the group of child objects comprising a switch, determining a model and number of the switches; and determining the configuration information of the group of child objects based on the model and number of the switches.

4. The method according to claim 3, wherein determining the configuration information of the group of child objects associated with the parent object in the object list further comprises:

determining whether the group of child objects comprises a non-switch object in the object list;

in response to the group of child objects not comprising a non-switch object, prompting an error message;

in response to the group of child objects comprising a non-switch object, determining the model and number of the non-switch objects; and determining the configuration information of the group of child objects based on the model and number of the non-switch objects.

5. The method according to claim 4, wherein generating the object identifier of the target object based on the configuration information of the parent object and the configuration information of the child objects comprises:

determining the model of the parent object; and generating the object identifier of the target object based on the model of the parent object, the model and number of the switches, and the model and number of the non-switch objects.

6. The method according to claim 5, further comprising:

looking up the object list for a chassis part of child objects in the group of child objects;

in response to not finding the chassis part of the child objects, prompting an early warning message; and in response to finding the chassis part of the child objects, determining the model and number of the child objects based on the chassis part.

7. The method according to claim 1, wherein the type of the target object is a rack device, and the method further comprises:

in response to receiving a request to add a new object identifier in the local system:

determining that configuration information corresponding to the new object identifier is the same as existing configuration information; and deleting or updating the existing configuration information.

8. The method according to claim 7, further comprising:

in response to receiving a new object list, determining whether the new object list is a child object list; and in response to determining that the new object list is a child object list of a parent object list, assigning object identifiers associated with the parent object list to objects in the new object list.

9. The method according to claim 8, further comprising:

obtaining the number of objects in the parent object list, the number of objects in the parent object list whose status is completed, and the number of objects in the new object list; and in response to the number of objects in the parent object list being greater than a sum of the number of objects in the parent object list whose status is completed and the number of objects in the new object list, prompting that the status of the parent object list is uncompleted.

10. The method according to claim 1, wherein the type of the target object is a computer part and accessory, and obtaining the type of the target object from the object list comprises:

determining multiple candidate objects based on the object list;

determining a target attribute value of each of the multiple candidate objects;

determining a candidate object with the greatest target attribute value among the multiple candidate objects as the target object; and determining the type of the target object.

11. An electronic device, comprising:

at least one processor of a local system; and memory of the local system, the memory coupled to the at least one processor and having instructions stored therein, the instructions, when executed by the at least one processor, causing the electronic device to perform actions comprising:

obtaining, by the at least one processor of the local system, a type of a target object from an object list stored in the memory of the local system;

classifying, by the at least one processor of the local system, the target object into a corresponding registration category based on the type of the target object;

determining, by the at least one processor of the local system, registration information for registering the target object in a remote system based on the corresponding registration category, wherein the local system is configured to communicate with the remote system over at least one network, the registration information being obtained at least in part by the local system from the remote system over the at least one network;

generating, by the at least one processor of the local system, an object identifier for registering the target object in the remote system based on the type of the target object, the object list, and the registration information;

transmitting, under control of the at least one processor of the local system, the object identifier over the at least one network from the local system to the remote system for registration of the target object therein; and responsive to receipt in the local system, from the remote system, an indication of successful registration of the target object in the remote system utilizing the object identifier, initiating, by the at least one processor of the local system, at least a portion of at least one workflow utilizing the object identifier in the local system.

12. The electronic device according to claim 11, wherein the type of the target object is a blade server, and generating the object identifier of the target object based on the type of the target object, the object list, and the registration information comprises:

determining a parent object constituting the target object in the object list;

determining a group of child objects associated with the parent object in the object list; and generating the object identifier of the target object based on the parent object and the group of child objects.

13. The electronic device according to claim 12, wherein the parent object is a chassis of a blade server, and determining configuration information of the group of child objects associated with the parent object in the object list comprises:

determining whether the group of child objects comprises a switch in the object list;

in response to the group of child objects comprising a switch, determining a model and number of the switches; and determining the configuration information of the group of child objects based on the model and number of the switches.

14. The electronic device according to claim 13, wherein determining the configuration information of the group of child objects associated with the parent object in the object list further comprises:

determining whether the group of child objects comprises a non-switch object in the object list;

in response to the group of child objects not comprising a non-switch object, prompting an error message;

in response to the group of child objects comprising a non-switch object, determining the model and number of the non-switch objects; and determining the configuration information of the group of child objects based on the model and number of the non-switch objects.

15. The electronic device according to claim 14, wherein generating the object identifier of the target object based on the configuration information of the parent object and the configuration information of the child objects comprises:

determining the model of the parent object; and generating the object identifier of the target object based on the model of the parent object, the model and number of the switches, and the model and number of the non-switch objects.

16. The electronic device according to claim 15, wherein the actions further comprise:

looking up the object list for a chassis part of child objects in the group of child objects;

in response to not finding the chassis part of the child objects, prompting an early warning message; and in response to finding the chassis part of the child objects, determining the model and number of the child objects based on the chassis part.

17. The electronic device according to claim 11, wherein the type of the target object is a rack device, and the actions further comprise:

in response to receiving a request to add a new object identifier in the local system:

determining that configuration information corresponding to the new object identifier is the same as existing configuration information; and deleting or updating the existing configuration information.

18. The electronic device according to claim 17, wherein the actions further comprise:

in response to receiving a new object list, determining whether the new object list is a child object list; and in response to determining that the new object list is a child object list of a parent object list, assigning object identifiers associated with the parent object list to objects in the new object list.

19. The electronic device according to claim 18, wherein the actions further comprise:

obtaining the number of objects in the parent object list, the number of objects in the parent object list whose status is completed, and the number of objects in the new object list; and in response to the number of objects in the parent object list being greater than a sum of the number of objects in the parent object list whose status is completed and the number of objects in the new object list, prompting that the status of the parent object list is uncompleted.

20. A computer program product comprising a non-transitory computer-readable medium having machine-executable instructions stored therein, wherein the machine-executable instructions, when executed by a machine, cause the machine to perform actions comprising:

obtaining, by at least one processor of a local system, a type of a target object from an object list stored in a memory of the local system;

classifying, by the at least one processor of the local system, the target object into a corresponding registration category based on the type of the target object;

determining, by the at least one processor of the local system, registration information for registering the target object in a remote system based on the corresponding registration category, wherein the local system is configured to communicate with the remote system over at least one network, the registration information being obtained at least in part by the local system from the remote system over the at least one network;

generating, by the at least one processor of the local system, an object identifier for registering the target object in the remote system based on the type of the target object, the object list, and the registration information;

transmitting, under control of the at least one processor of the local system, the object identifier over the at least one network from the local system to the remote system for registration of the target object therein; and responsive to receipt in the local system, from the remote system, an indication of successful registration of the target object in the remote system utilizing the object identifier, initiating, by the at least one processor of the local system, at least a portion of at least one workflow utilizing the object identifier in the local system.

* * * * *